Oct. 5, 1943.  O. J. WARMAN  2,331,087
TIRE VULCANIZING BAG
Filed July 3, 1942  2 Sheets-Sheet 2

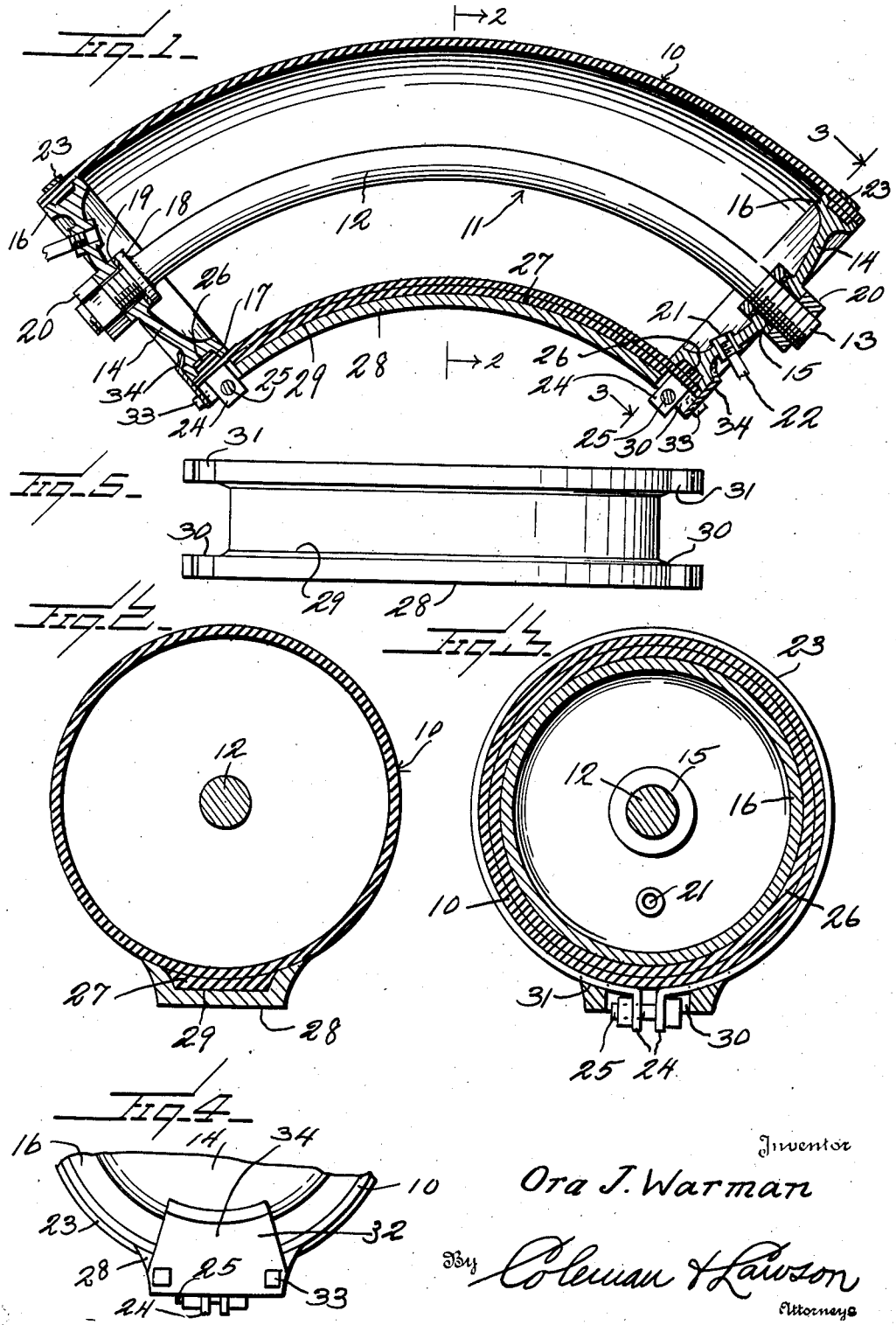

Inventor
Ora J. Warman
By Coleman & Lawson
Attorneys

Patented Oct. 5, 1943

2,331,087

UNITED STATES PATENT OFFICE 2,331,087

TIRE VULCANIZING BAG

Ora J. Warman, Pomona, Calif.

Application July 3, 1942, Serial No. 449,639

11 Claims. (Cl. 18—45)

This invention relates generally to tire repair and vulcanizing devices and pertains particularly to improvements in the core units disposed within the tire casing for the application of heat to the portion to be vulcanized.

A principal object of the present invention is to provide an improved steam bag or core unit employing a novel rubber sleeve carried upon a supporting frame and coupled thereto in a novel manner, such sleeve being designed to house the heating fluid in a manner to readily transmit the heat to the desired area of the tire casing to effect the desired vulcanizing action in the quickest and most economical manner.

Another object of the invention is to provide a vulcanizing steam bag designed in such a manner as to require the use of a minimum of rubber for its proper construction and having internally ribbed ends to facilitate the attachment thereto of rigid end closure walls which form a part of the supporting structure upon which the bag is mounted.

Another object of the invention is to provide a vulcanizing bag or sleeve structure having a bead rib with which is detachably coupled a bead plate which is rigidly connected with the supporting frame for the bag or sleeve, the said bead plate being replaceable by plates of different sizes and the bead of the sleeve functioning to facilitate the placement of such bead plate in the proper working position in a minimum of time and with a minimum of effort.

The invention will be best understood from a consideration of the following detailed description taken in connection with the accompanying drawings, it being understood, however, that the invention is not to be considered as limited by the specific illustration and description but that such illustration and description constitutes a preferred embodiment of the invention.

In the drawings—

Figure 1 is a view in longitudinal section of one embodiment of the present invention wherein the rubber sleeve of the vulcanizing bag directly receives the heating fluid and is supported upon a skeleton type frame.

Figure 2 is a sectional view on the line 2—2 of Figure 1 and upon an enlarged scale.

Figure 3 is a sectional view on the line 3—3 of Figure 1, on an enlarged scale.

Figure 4 is a fragmentary view showing the bead plate clamp.

Figure 5 is a view in plan of the bead plate per se.

Figure 6 is a longitudinal sectional view of another embodiment of the invention, which embodiment is designed for use upon the heavy duty tires where high pressures are used in the vulcanizing operation.

Figure 7 is a view in end elevation of the embodiment shown in Figure 6.

Figure 8 is a transverse section taken on the line 8—8 of Figure 6.

Referring now more particularly to the drawings the rubber sleeve of the embodiment of the present vulcanizing bag or unit shown in Figures 1 to 4 inclusive is indicated generally by the numeral 10 and the supporting frame structure for this sleeve is generally identified by the reference character 11.

The frame structure 11 comprises a single arcuate bar 12 formed of aluminum, steel, or any other suitable metal and screw threaded upon its two ends as indicated at 13. The frame also includes the circular end plates 14 which are preferably domed as shown in Figure 1, and each of which has a central bossed opening 15 and a relatively wide peripheral rim 16.

The rim of each end plate 14 is provided with an encircling channel 17, the purpose of which will be hereinafter described.

At the inner end of the threaded portion 13 at each end of the bar 12 there is secured the collar 18 which may be in the form of a nut threaded onto the bar and welded thereto or it may be initially formed with the bar as an integral part thereof. The threaded portion of the bar is designed to extend through the bossed opening 15 of an end plate in the manner shown and there is interposed between the inner end edge of the end plate opening and the fixed collar 18, a fluid tight gasket 19 of copper or other suitable material.

After the end plates 14 have been placed in position upon the end of the bar 12 a securing nut 20 is threaded onto each end of the bar to tightly secure the end plates against the adjacent collar 18.

Each end plate 14 has a threaded fluid admission opening 21 to which is connected a pipe 22 for facilitating introduction of steam or other heated fluid into the bag.

In the manufacture of the bag the grooves 17 of the end plates 14 are filled with live rubber and the sleeve is then drawn over the frame so that the two ends will be closed by the end plates 14. There are then placed around the end plates upon the outer side of the said sleeve the clamps 23, the ends of which are brought into spaced relation as indicated at 24 and coupled together by the bolt 25 as shown in Figure 3. This clamp is closed so as to lightly press the sleeve against the rubber material in the channel or groove of the adjacent end plate and the unit is then placed in a suitable vulcanizing kettle and is subjected to a vulcanizing operation so as to cause the live rubber in the grooves to be vulcanized to the inner wall of the sleeve thereby forming upon such inner wall and adjacent each end of the sleeve the rib 26.

In a similar manner the bead rib 27 is formed along the inner or concave side of the arcuate sleeve by the employment of the channeled bead plate 28. The channel 29 of this plate is filled with live rubber and the plate is disposed in proper position against the inner or concave side of the sleeve as shown in Figure 1. Adjacent each end the bead plate is cut out as indicated at 30 to receive the ends 24 and the securing bolts 25 of the adjacent clamp 23. The top face of the bead plate adjacent the cut out 30 may also be transversely recessed as indicated at 31 to receive the clamp band adjacent each of its ends.

The bead plate is maintained in position against the sleeve by the clamp plates 32, each of which positions against an end of the bead plate 28 where it is secured by the tap screws 33, and has an inwardly curved top edge portion 34 which hooks over the outer edge of the rim 16 of the adjacent plate 14 as shown in Figure 1. After the bead plate has been secured in position in the manner stated so as to press the soft rubber contained in the channel 29 against the wall of the sleeve, the unit is placed in a vulcanizing kettle and suitably heated to effect vulcanization of the rubber rib 27 to the wall of the sleeve.

The bead plate 28 is designed to fill in the area between the beads of the tire casing and by providing several different bead plates of different widths but each having a channel of the same width to receive the rubber rib 27 of the sleeve, it will be apparent that the bag or unit may be employed in tires of different sizes.

In the use of the bag shown in Figure 1 the same is placed in the tire casing to cover the area to be vulcanized and the casing is then placed within a suitable outer jacket in which it is firmly clamped in the customary manner. Steam or hot water may then be introduced into the bag by one of the pipes 22 so as to establish the desired pressure within the bag at the desired temperature to effect the vulcanizing action.

The bag construction illustration in Figure 1 is not entirely suitable for vulcanizing heavy duty tires where heavy reinforcements are required in making repairs. For this work the embodiment of the invention illustrated in Figures 6 to 8 is designed. In this embodiment the sleeve is indicated generally by the numeral 35 while the supporting frame therefor is indicated generally by the numeral 36.

The supporting frame for the heavy duty form or embodiment of the invention comprises the arcuate metal tube 37 which is encased within the sleeve 35 in the manner illustrated. At each end this tube 37 is exteriorly reduced in diameter to form an encircling channel 38 and intermediate its end and upon the convex side the metal tube is provided, preferably adjacent each end, with a threaded port 39 in which is connected one end of a pipe 40 which extends through the adjacent end of the tube. Upon the inner or concave side of the tube there are provided the threaded openings 41 for the purpose hereinafter described.

Each end of the metallic tube 37 is closed by a plate 42 which is secured to the adjacent end of the tube by screws 43. Each of these plates is provided with a suitable opening 44 for the passage therethrough of the adjacent pipe 40 and with a second opening 45 which may have a pipe 46 connected therein to facilitate the introduction of a heating medium such as live steam into the tube or this opening may be employed, if desired, to carry electric current carrying wires into the tube to supply an electrical resistance heating element, not shown.

The walls 42 are here shown as being flat but they may be domed if desired like the walls 14. It will be noted that each end wall or plate 42 is of a diameter equal to the major diameter of the tube 37 and thus a portion of the periphery of each plate extends beyond the bottom of the reduced portion 38 to form one side of this reduced portion or channel.

In constructing the heavy duty unit the channel 38 at each end of the tube is filled with live rubber and the sleeve 35 is placed on the tube in the manner shown and the whole unit is then placed in a vulcanizing kettle and subjected to the necessary heat to vulcanize the rubber in the channels to the inside of the tube thus forming upon the inner side of each tube the rib 47 which corresponds with the rib 26 upon the inner side of the tube 10.

In order to maintain the proper contact pressure between the rubber in each channel 38 and the sleeve 35 there is placed around each end of the sleeve to surround the adjacent channel, the split clamp ring 48, the two ends 49 of which are drawn together by the bolt 50. After the vulcanization of the rib to the sleeve has been completed these clamps may be drawn more tightly around the sleeve to establish a leak tight joint between the sleeve and tube.

The inner or concave side of the sleeve 35 has formed therealong the rubber bead rib 51 and this encased in the elongated arcuate bead plate 52, fitting in the channel 53. This rib is formed in the same manner as the rib 27 in that the channel 53 of the bead plate is initially filled with live rubber and is placed in position against the concave inner side of the sleeve where it is held by the stud bolts 54 which are extended through suitable apertures in the bead plate and engage in the threaded aperture 41 of the tube 37. The unit is then subjected to vulcanizing heat to effect the desired union of the rib rubber 51 and the sleeve 35 after which the bead plates 52 may be removed to be replaced by one of greater or less width but having a channel of the same size so as to snugly receive the rib 51. Thus the bag may be used in the vulcanization of tires of different sizes.

In order that the sleeve 35 may be conveniently placed in position upon and removed from the tube 37, the sleeve and the rib 51 are split lengthwise and the securing bolts or screws 54 are extended through the division.

The tube or core 37 may be of aluminum or any other suitable metal and in the use of this embodiment of the invention, after the bag has been placed in the tire and the necessary jacket has been placed around the outside of the tire, water is pumped through one of the pipes 40 between the sleeve 35 and the core or tube, the other pipe 40 being closed during this operation by suitable valves or in any other desired manner. This water pressure may be built up to about one hundred and twenty five pounds. The water between the sleeve and core is then heated in a suitable manner as by the introduction of live steam thru one of the pipes 46 to the interior of the core or by the use of electric resistance heater means, which may be housed in the core and be supplied by wires passing through one of the openings 45. The temperature of the water between the sleeve and core is raised to about three hundred degrees and the pressure of the water will be increased slightly or to about one hundred and thirty five pounds at this temperature.

From the foregoing it will be readily apparent that the general features of construction of the two vulcanizing bags are alike in that each bag comprises a sleeve having internal ribs at the ends which function to maintain these sleeves in position upon a supporting frame, the frame in one case comprising an arcuate bar with grooved or channeled plates at the ends and in the other case a tubular arcuate core having a plate at each end and having the channels to receive the ribs of the sleeve.

I claim:

1. A tire casing vulcanizing bag comprising an elongated arcuate frame, an annular channel encircling and cut into the material of the frame at each end, an arcuate rubber sleeve encasing and removably mounted on said frame, a rib formed around and upon the inner surface of said sleeve at each end for engagement one in each channel and means for introducing fluid into the sleeve between the same and the frame.

2. A vulcanizing bag as set forth in claim 1, with an elongated arcuate rigid bead plate extending lengthwise of the concave side of the sleeve, and means connecting the bead plate with the frame.

3. A vulcanizing bag as set forth in claim 1 including a rib formed integrally with and extending lengthwise of the concave side of said sleeve, a channeled bead plate formed to receive said rib in the channel thereof and extending the length of the rib, and means detachably coupling said bead plate with the frame.

4. A vulcanizing bag comprising an arcuate sleeve of a single thickness of material, cut square across at each end and having an annular rib upon the inner surface thereof adjacent each end, a frame designed to be positioned within and support said sleeve and having an annular channel at each end in which the adjacent annular rib fits, a clamp encircling each end of the sleeve around and securing the adjacent rib in its channel, an elongated, arcuate, rigid bead plate disposed against and extending throughout the major part of the length of the sleeve upon the concave side thereof, means securing said bead plate to the frame, and means for introducing fluid into the sleeve between the same and the frame.

5. A vulcanizing bag as set forth in claim 4, including a rib formed integrally with the sleeve lengthwise thereof and upon the concave side, the said bead plate being channeled upon its convex side to receive the last mentioned rib, and the said securing means for the bead plate being removable for facilitating the separation of the bead plate from the unit.

6. A vulcanizing bag as set forth in claim 4 in which said frame comprises an arcuate bar extending through the sleeve and a plate removably secured to each end of the bar and disposed within the adjacent end of the sleeve, the said channel means being formed in the periphery of each plate.

7. A vulcanizing bag as set forth in claim 4 in which said frame comprises a tubular core fitting snugly within the sleeve and a plate removably secured to and closing each end of the core, said core at each end being exteriorly reduced in diameter to form with the adjacent plate the stated channel means for the sleeve internal rib.

8. A vulcanizing bag of the character described comprising a tubular rubber sleeve, an annular rib formed upon the inner side of the sleeve at each end, a rigid arcuate bar extending longitudinally through the sleeve and screw threaded at each end, a stop collar at each end of the bar at the inner end of the screw threads, a circular plate within each end of the sleeve and of a diameter substantially the same as the inside of the sleeve and having a central aperture designed to receive the threaded end of said bar each end of the bar having a plate mounted thereon, a securing nut upon each end of the bar maintaining the adjacent plate in position against the adjacent collar, each plate having a channel formed around its periphery to receive the adjacent annular rib, a clamp band encircling each end of the sleeve in the plane of a rib and end plate, and means for introducing fluid into and removing fluid from the sleeve.

9. A vulcanizing bag as set forth in claim 8 including a rib formed integral with and extending through the major portion of the length of the sleeve upon the concave side thereof, an arcuate rigid bead plate extending lengthwise of the concave side of the sleeve and having a channel in its convex side to receive the last mentioned rib, and means detachably coupling the ends of the bead plate with said circular plates.

10. A vulcanizing bag comprising an arcuate, tubular rubber sleeve having an annular rib upon the inner side and adjacent each end, an arcuate tubular core having a portion of each end reduced in external diameter to provide a channel for the reception of an annular rib, a plate removably secured across each end of said core and having a portion extending across and forming one side of said channel, a clamp band encircling each end of the sleeve in the plane of the adjacent rib and channel, means for conducting a fluid through an end plate and through the wall of the core for discharge between the core and the sleeve, and means for facilitating the introduction of a heating medium into the core.

11. A vulcanizing bag as set forth in claim 10 including a rib formed integrally with and extending throughout the major portion of the length of the exterior surface of the sleeve upon the concave side thereof, the sleeve and external rib being longitudinally divided, an arcuate rigid bead plate disposed lengthwise of the concave side of the sleeve and having a channel in its convex side for the reception of said external rib, and securing elements connected with said bead plate and extending from the same through the external rib and the sleeve for connection with said core.

ORA J. WARMAN.